United States Patent
Zhang et al.

(10) Patent No.: US 6,702,560 B2
(45) Date of Patent: Mar. 9, 2004

(54) PLASTIC TANDEM EXTRUSION SIZER MOLD

(76) Inventors: Ming Zhang, Rm 509, Building 6 of Taiyueyuan, Haidian District, Beijing (CN); TangCin Du, Rm. 509, Building 6 f Taiyueyuan, Haidian District, Beijing (CN)

( * ) Notice: Subject to any disclaimer, the term of this patent is extended or adjusted under 35 U.S.C. 154(b) by 190 days.

(21) Appl. No.: 09/851,548

(22) Filed: May 8, 2001

(65) Prior Publication Data

US 2001/0043963 A1 Nov. 22, 2001

(30) Foreign Application Priority Data

May 8, 2000 (CN) ............................................. 00107267

(51) Int. Cl.⁷ .............................................. B29C 47/90
(52) U.S. Cl. ........................ 425/71; 425/186; 425/195; 425/326.1; 425/384; 425/388
(58) Field of Search ........................ 425/71, 186, 195, 425/326.1, 384, 388

(56) References Cited

U.S. PATENT DOCUMENTS

| | | | | |
|---|---|---|---|---|
| 3,546,745 A | * | 12/1970 | Ball | 425/71 |
| 4,181,487 A | * | 1/1980 | Kessler | 425/326.1 |
| 5,316,459 A | * | 5/1994 | Melkonian et al. | 425/71 |
| 5,780,071 A | * | 7/1998 | Racioppi et al. | 425/388 |
| 6,050,800 A | * | 4/2000 | Chapman et al. | 425/71 |
| 6,200,119 B1 | * | 3/2001 | Pelto et al. | 425/71 |
| 6,287,102 B1 | * | 9/2001 | Franz et al. | 425/71 |
| 6,296,464 B1 | * | 10/2001 | Purstinger | 425/388 |
| 6,394,782 B1 | * | 5/2002 | Grassi | 425/384 |

* cited by examiner

*Primary Examiner*—Robert Davis
*Assistant Examiner*—Joseph S Del Sole
(74) *Attorney, Agent, or Firm*—Kilpatrick Stockton LLP

(57) ABSTRACT

A new plastic tandem extrusion sizer mold. The mold includes an inlet plate, middle plates and an outlet plate which are connected with each other in series by columniform pin, and then side baffles are added to mount on a base with the aid of bolts. A rectangular inlet plate, middle plates and outlet plate, which constitute a cavity of different shape, are placed upright and connected together in sequence and in series. Compared with the conventional sizer mold, the present sizer mold gets over the limitations of cavity parting, machining deep holes, cutting gas slots, trivial design and complex manufacture process, and has a shortened design period and simplified technological process, and can be manufactured rapidly.

9 Claims, 8 Drawing Sheets

FIG. 1

Prior Art

PLASTIC TANDEM EXTRUSION SIZER MOLD

FIELD OF INVENTION

The present invention relates to forming device for the manufacture of a profile, especially to a plastic tandem extrusion sizer mold and the manufacture method thereof, by which the quality of profile extruded is ensured, and its design and manufacture period is shortened effectively and steadily.

BACKGROUND OF INVENTION

Figure 1:
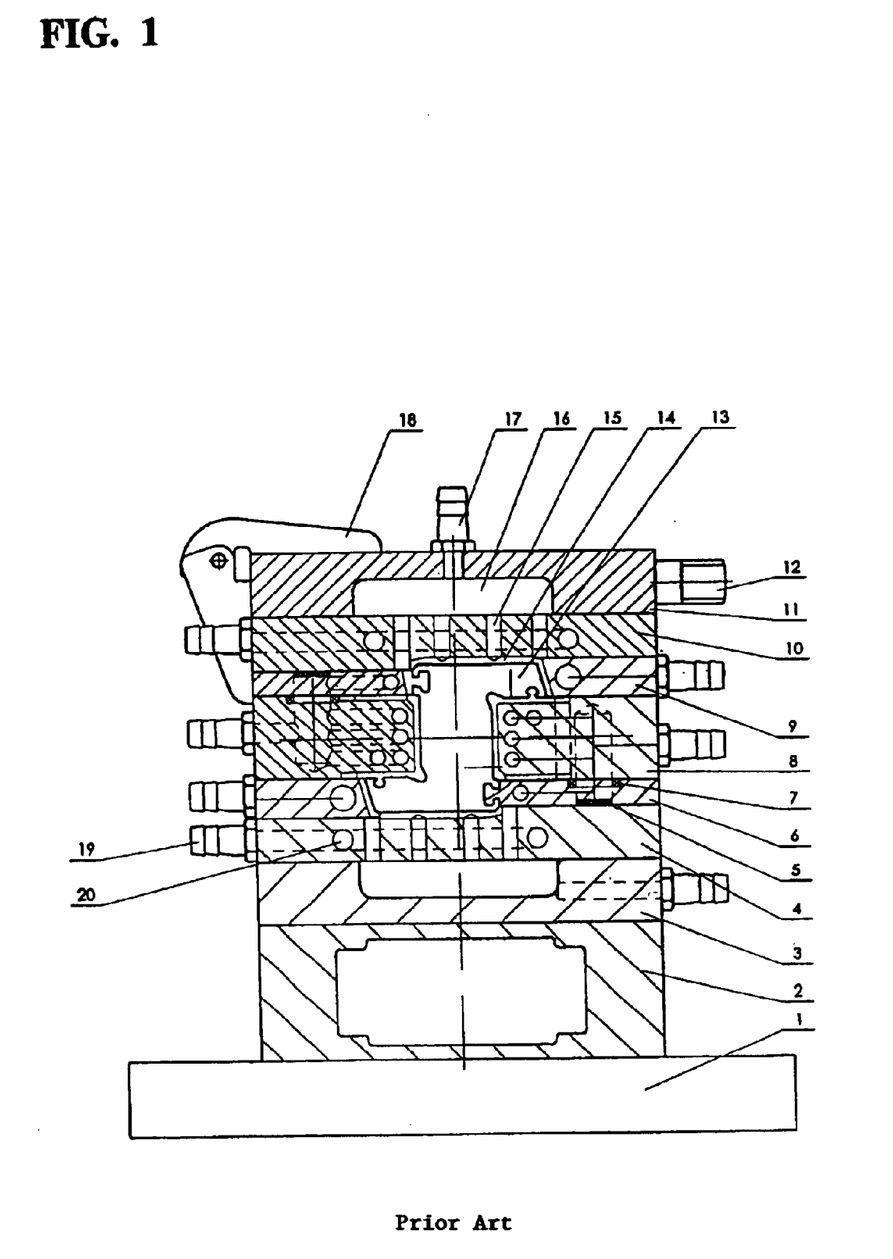
FIG. 1 is a sectional view of sizer mold for subsection extrusion of the prior art.

Traditionally, the well-known extrusion sizer mold, illustrated in FIG. 1 as a sectional view of a sizer mold for subsection extrusion, is made up of one to six single sizers installed with isometric distance on a base formed by sole plate seat 1 and sole plate 2. The mold cavity 13 is surrounded by upper plate 10, side baffle 9, side baffle 8, side baffle 6 and lower plate 4. The upper cover constituted by upper plate 10 and upper cover plate can be moved upward around the axis of hinge 18 and opened: handle 12 is the handle for operation. The whole cavity is of the open type. The parting face is parallel to the extrusion direction, and the selection of the parting face depends on the complexity of the cavity.

Conventionally the cavity is divided into several opened parts formed by plate at transition points, a female die cavity which is not easy to machine, and nook points, in order to dig, mill and grind every part easily. A line cutting electric spark process is often taken to machining those which are more complicated in shape, and are very difficult to machine, for example the side baffle 8, and then all parts are assembled together to form a mold cavity. Gas slot 14 is machined at the inner face of the cavity channel, and a gas path system is formed by gas slot 14, gas hole 15, gas chamber 16 and gas extraction nozzle 17. Gas slot 14 is communicated with gas hole 15, and then communicated with gas chamber 16, and gas nozzle 17 and gas chamber 16 are communicated with each other. The run-through cross section between the gas hole 15 and gas slot 14 is too small, that is, the effective cross section for gas extraction is too small, and this inevitable defect results in that the vacuum of the cavity is not easy to establish, and it goes against the sizing of the profile.

Around the cavity a water hole 20 is formed. The water hole 20 keeps a certain distance from the gas slot 14 to prevent water leakage brought on by the connection between them. Not only this, but also the arrangement and connection of the water hole 20 is complicated. As the water hole goes through the parting face of the plate, the O-shape gasket 7 is used to seal the clearance between them, and the technological hole should be plugged up by aluminum plug 5 as the water hole goes through the side baffle 6. All of water holes are holes whose depth is more than 20 times its diameter, and machined along the length direction of each sizer, so the water holes need to be far more from the gas slots (that is, from the cavity) to insure that water leakage will not occur, but this causes the disadvantage of bad cooling of the production in the cavity.

For the sake of full cooling and sizing of the production in the cavity, a conventional sizer mold is made up of several sections of sizers installed axially with isometric distance on a sole plate. Generally the section number is one to six; the least number is one. The length of each section is about 200 mm to 600 mm. The disadvantage of this kind of mold installed by parts is that the geometry center of its cavity is not easy to keep in a same line, that is, it is difficult to ensure the coaxiality of sections.

To sum up, this kind of cavity opened type sizer mold is complicated in configuration, its manufacture requiring several machines such as bull planer, omnipotence miller, grinder, line cutting electric spark process, omnipotence tool miller and omnipotence tool grinder etc., and through several complicated working procedures, so the accumulative error is difficult to avoid and cavity dimension precision is not easy to ensure, and especially the rectification of special parts of the cavity could not be met. For different productions, the parting face is different, and the connection between the sizer and gas and water also is different, so that the exterior connection is difficult to standardize, and the positions and numbers of the gas nozzle 17 and the water nozzle 19 are different in case of different parting face and different section assembly. Once the profile is plugged up, only manual dismantling can be done, the resultant disadvantage being manpower consumption, damage to the installation precision, and unavoidable replacement error. On account of the development of the extrusion mold, most corporations domestic and foreign carry out this conventional method, the only different is that each corporation has its own manufacture experiments.

SUMMARY OF THE INVENTION

The object underlying the invention is to overcome the disadvantage of the above conventional extrusion sizer mold, and to provide a new plastic tandem extrusion sizer mold. The sizer mold of the present invention gets over the limitations of cavity parting, machining deep holes, cutting gas slots, trivial design and bad precision, and the product manufactured by this sizer mold have simple and novelty construction, and steady performance, and can be manufactured rapidly.

An other object of the present invention is to provide a method for manufacturing the above plastic tandem extrusion sizer mold. The manufacture method of the present invention is based on the standardization manufacture for the machining process of the central parts constituting the plastic tandem extrusion sizer mold. Semi-finished parts are made ready in advance, so the period for production design is shortened, and manufacturing technological is simplified, manufacturing efficiency improved, precision machining highly concentrated, and performance of the production steadied.

The objects are accomplished by a sizer mold according to the present invention and by a method for manufacturing the above sizer mold. The plastic tandem extrusion sizer mold of the present invention contains plates, cavity, water holes, gas holes and gas slots, and is characterized in an inlet plate, middle plates and an outlet plate are connected with each other in series by columniform pin, and then side baffles are added to fix them up on a base with the aid of bolts. A close cavity is formed in the center of the inlet plate, the middle plates and the outlet plate, there are no joints around the cavity, and the cavity has no parting sections. There are water holes and gas holes at the circumference of the cavity, and a rubber sealing gasket, which connects water holes and separates gas slots, is placed between the corresponding water holes of two plates. The cavity, gas slots, gas holes and gas nozzles communicate with each other, a water nozzle installed at the inlet plates is communicated with water hole, and a gas nozzle is installed on the middle plate selected.

The inlet plate, several middle plates and the outlet plate of the same thickness are placed upright and arranged in series longitudinally.

A concave stand is milled at one end face of the inlet plate and the middle plate. At the four corners of the concave stand, the gas holes are drilled. The gas slots are formed by the combination of plates and concave stand in turn, and the gas slots are connected with each other in series via the gas holes at the four corners. Gas is taken out in subsection from the gas nozzles on the middle plate selected and gas holes connected, and each gas slot contributes itself to the parallel connection between sections.

No gas holes are formed at the inlet plate and the last middle plate. The cavity at the outlet plate is a rectangle cavity for covering the cavity at the middle plate.

An annular water trough surrounds the cavity at the inlet end of the inlet plate. At the outlet end, water-through hole is drilled in the annular water trough surrounding the cavity. The water-through holes are of the same dimension and distribute uniformly, and the water holes are connected to the water holes surrounding the cavity at the middle plate.

A water nozzle connected with annular water trough is installed on the inlet plate, and the annular water trough is blocked up inside the inlet plate by the water sealing plate.

The hole depth of all the water holes at the circumference of the cavity is as long as 10 times of the hole diameters, or smaller than 10 times of the hole diameters, and the water holes are machined beside the cavity.

The disassembly holes are installed on the said inlet plate and the middle plate.

The orientation grooves of V shape are machined at the lower ends of the said inlet plate and outlet plate.

The base is constituted of the sole plate seat. A sole plate and two orientation track fixed on the sole plate.

According to the present invention, except for the cavity and the water holes configurations of which vary along with different designs, other parts of the tandem sizer mold of the invention can be standardized in configuration, so according to the manufacture method of the sizer mold put forward in the present invention, the majority parts of the sizer mold can be manufactured in standard working procedures. The technology working flow and working process can be simplified greatly, and man-hour consumption can be reduced, so that the working time limit will be cut down and the manufacture cost will be reduced.

The manufacture method of plastic tandem extrusion sizer mold of the present invention is characterized in that:

1) the inlet plate, middle plates and outlet plate are treated by forging and annealing after material selection, and then planed and milled to form the figurations, after quenching and tempering, the plates are grinded in figurations, and concave stand and gas slots are milled, chamfers are machined, after which the manufacture of the standardization blanks is finished;

2) the standardization blanks of the inlet plate, middle plates and outlet plate are manufactured, preferably in a numerical control manufacture center, to form orientation pin hole, gas hole, bolt through-hole, immersed holes, screw thread hole, and disassembly hole on them, after which the standardization blanks are finished as blank semi-finished parts;

3) the semi-finished inlet plate and semi-finished outlet plate are fixed together by the columniform pin, and with the aid of a line cutting process, two V orientation grooves are manufactured at the same time at the lower parts of the above two plates. The centers of the two grooves must be coaxial;

4) the outlet plate with a V orientation groove is fixed via orientation pin hole, and a center rectangle hole is machined by line cutting process, and then the outlet plate marked is finished as a standard outlet plate;

5) the inlet plate with a V orientation groove and the middle plates finished as blank semi-finished parts are all marked and finished as blank standard inlet plate and blank standard outlet plates;

6) The sole plate, sole plate seat, and side baffles are stainless castings; internal stress is removed after age treatment, then the castings are planed, milled and grinded, and finished as blank semi-finished parts;

7) the top faces of the orientation tracks raised on the surfaces of the blank semi-finished sole plate are high-frequency quenched and grinded, so that the hardness, wear-resistance and linearity are improved.

8) the sole plates which have been high-frequency quenched and sole plate seat and side baffles which have been finished as blank semi-finished parts are drilled and tapped, and become standard parts;

9) column orientation blocks are lathed and quenched and finished as standard column orientation blocks; the rubber sealing gaskets, gas nozzles and water nozzles are outsourcing parts;

10) for the blank standard inlet plate, the annular water trough which is in the inner side of the intake end is machined according to the demand of design; water export holes connected with the annular water trough and immersed holes for rubber sealing gaskets are manufactured at the export end, the openings of the annular water trough are blocked up by the annular water sealing plates and weld-sealed, so that cooling water flows into the annular water trough from the water intake hole of the annular water trough, and is distributed in the annular water path and discharged from the water export hole to leave the inlet plate.

11) for the blank standard middle plates, water export holes and immersed holes for rubber sealing gaskets are machined according to the demand of design;

12) the inlet plate with annular water trough and the middle plates with water export holes are manufactured with numerical control line cutting electric spark process to form shaping cavity according to the demand of design; the dimension precision of the cavity and rectification of special positions are ensured by the numerical control process technique, the orientation benchmark of the cavity being consistent with the orientation pin hole standardized;

13) after the shaping cavity manufactured by the numerical control technique, the standard inlet plate and the standard middle plates are polished to meet the design demand, and then they are ready for assembly;

14) the sole plate seat is fastened onto the sole plate by bolts to form a base, and rubber sealing gaskets are placed into the immersed holes of the middle plate water holes; columniform pins are placed into the corresponding pin holes of every plate; the standard inlet plate, middle plates and outlet plate are placed upright and connected with each other in sequence and in series; the middle plates are put upright on the orientation tracks of the sole plate, and the inlet plate and outlet plate are placed at two ends and make the side baffles between them, one at the right, the other at the left; the bolts are screwed down at ends to install the inlet plate, middle plates, outlet plate and two side baffles together to form a cavity unit, and then the bolts at the two side baffles are screwed down to install the cavity unit onto the base; finally the columniform orientation blocks at the two ends of the sole plate are leaned against the corresponding V orientation grooves and locked in place, whereupon the assembly of tandem sizer mold is finished.

Compared with the prior art, the present invention has the following advantages. The cavity of the conventional sizer mold, which is a parting one, is constituted by several pieces of plates putting together up and down, the present invention gets rid of this disadvantage, and also gets over the limitations of machining deep holes, cutting gas slots, trivial design, complex manufacture process and bad precision. The cavity of the invention is finished as an integral one and need not be manufactured again. Plates are connected in series along longitudinal direction, and holes easily are drilled on plates, gas slots are constituted by milled parts, all these make the present invention have novelty construction, manufacture technological process is shorten, and with the aid of numerical control technique, the dimension precision of the mold, rectification of special positions, and arrangement of water holes can be controlled accurately. The manufacture of other parts and outside gas and water connections are all standardized, so that the design and manufacture period of the present invention can be reduced at its maximum probability. The mold of the invention is easy to dismantle in mechanization, so that the speed of manufacture can be improved effectively, too.

The following description of embodiment of the invention in conjunction with the attached drawings serves to explain the invention in greater detail.

DESCRIPTION OF THE PREFERRED EMBODIMENT

In the figures, 21 designates an inlet plate, 22 designates a water nozzle, 23 designates a gas nozzle, 24 designates stationary rings, 25 designates a middle plate, 26 designates a disassembly hole, 27 designates a side baffle, 28 designates an outlet plate, 29 designates a base, 30 designates a sole plate seat, 31 designates a columniform pin, 33 designates an inner hexagon-headed screw, 34 designates an annular water trough, 35 designates a cavity, 36 designates a water hole, 37 designates a gas hole, 38 designates a water sealing plate, 39 designates an orientation block, 40 designates a sealing gasket, 41 designates an orientation track, 42 designates a screw thread hole, 43 designates a slotted hole, 44 designates a gas slot, 45 designates a V orientation groove, and 46 designates a concave stand.

Figure 2:
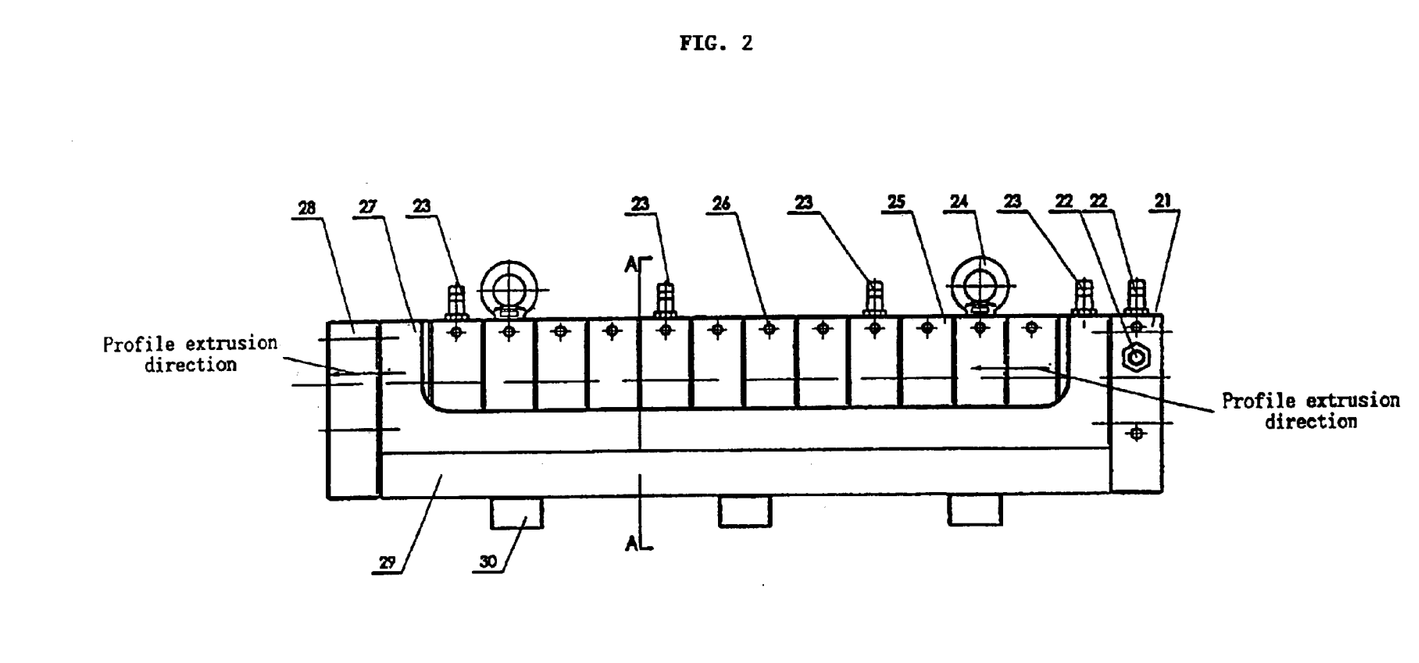
FIG. 2 shows schematically the whole structure of the plastic tandem extrusion sizer mold of the present invention.
Figure 5:
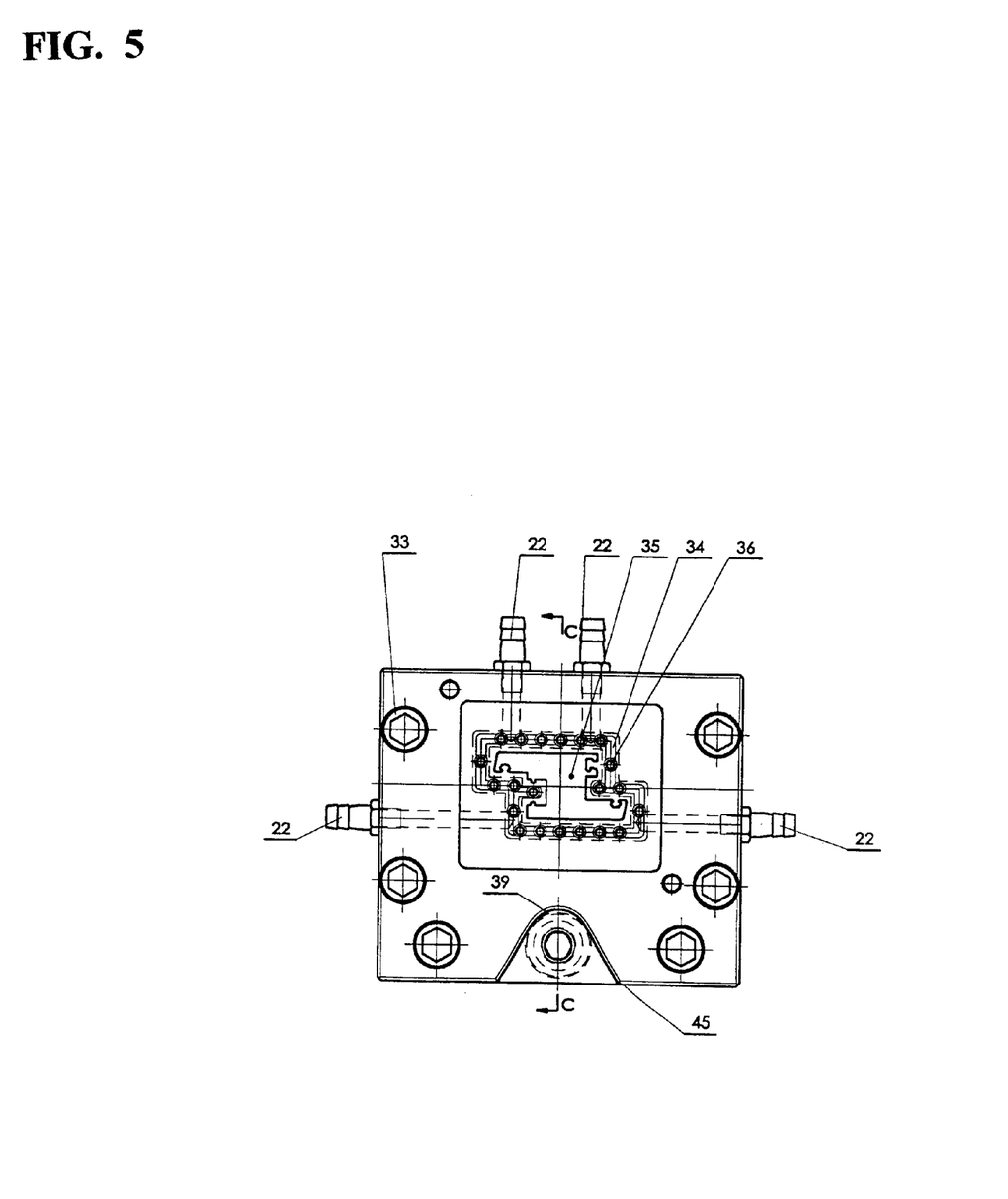
FIG. 5 is a view of inlet of the tandem sizer mold.
Figure 6:
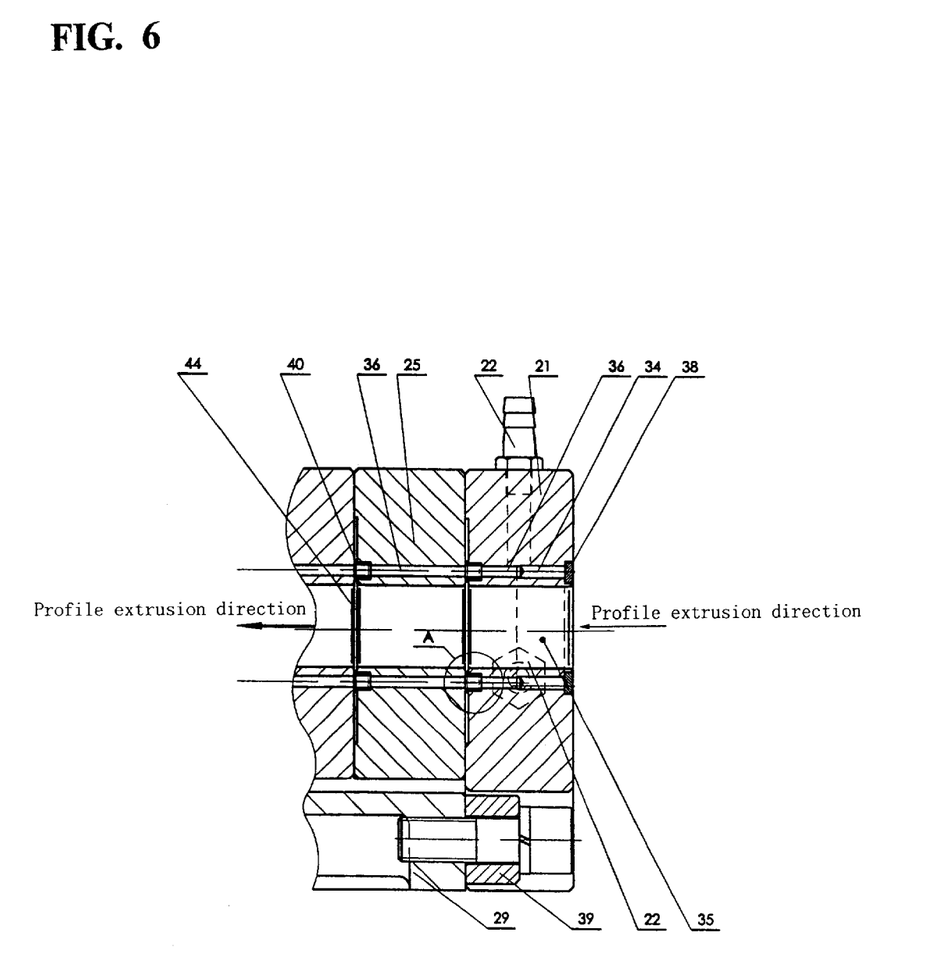
FIG. 6 is a sectional view along C—C in FIG. 5.
Figure 7:
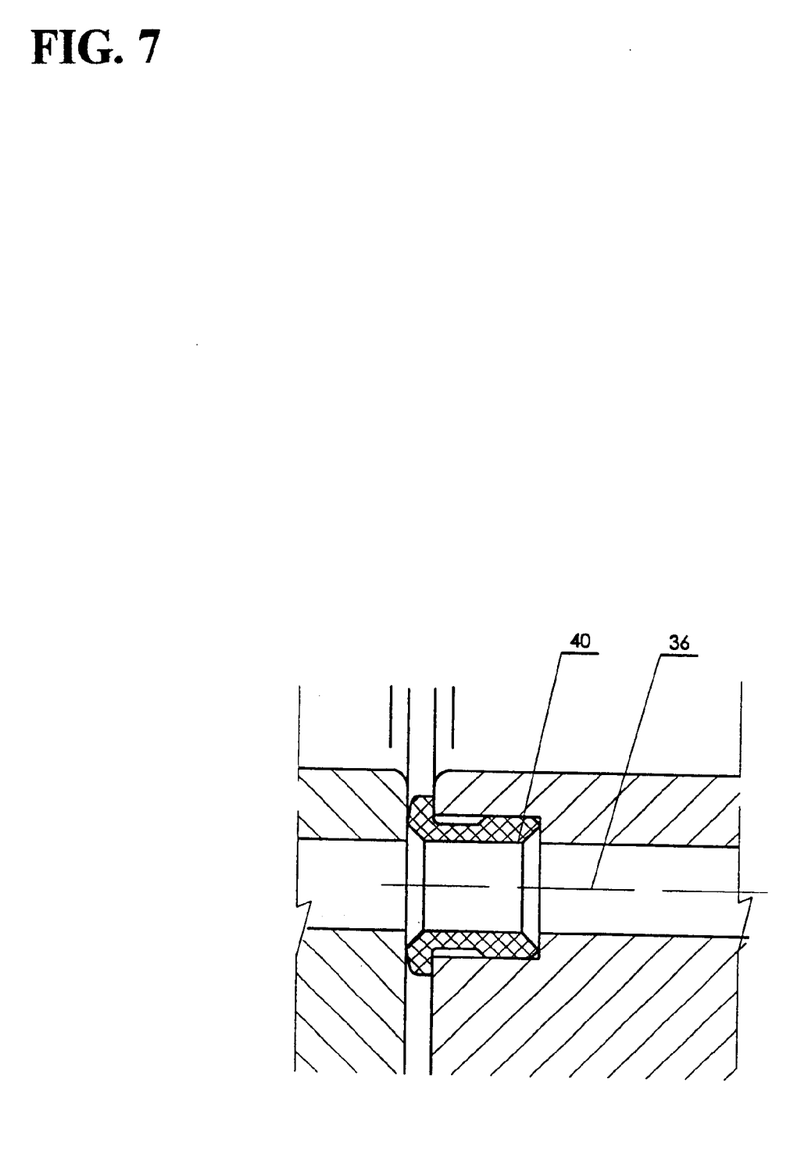
FIG. 7 is an enlarged view of A in FIG. 6.

As is shown in FIG. 2, the inlet plate 21, middle plates 25 and outlet plate 28 of the same thickness are placed upright and arranged in series longitudinally in the plastic tandem extrusion sizer mold of the present invention. Columniform pins 31 are used to connect these plates together, and then two U shaped side baffles 27 are sandwiched between the inlet plate 21 and outlet plate 28, and inner hexagon-headed screws 33 are used to fasten them from two ends, accordingly to strain longitudinally the inlet plate 21, middle plate 25 and outlet plate 28 to form a integral cavity unit, and then the cavity unit can be fixed onto the base constituted by sole plate 29 and sole plate seat 30 by screwing down three pairs of screws into the screw holes formed in the side baffles. Each side baffle has three holes along its longitudinal direction. The cavity 35 is formed in the center of the inlet plate 21, the middle plates 25 and the outlet plate 28. There are no joints around the cavity 35, and no parting sections, but there is water hole 36 and gas hole 37 at the circumference of the cavity 35. The rubber sealing gasket 40, which connects water holes 36 and separate gas slot 44, is placed between the corresponding water holes 36 of two plates. As shown in FIGS. 5, 6 and 7, the cavity 35, gas slot 44, gas hole 37 and gas nozzle 23 communicate with each other. The water nozzle 22 installed at the inlet plate 21 is communicated with water hole 36, and the gas nozzle 23 is installed on the selected middle plate 25. The middle plates 25 are made up of several pieces in order to get cooling sizing effects.

Figure 3:
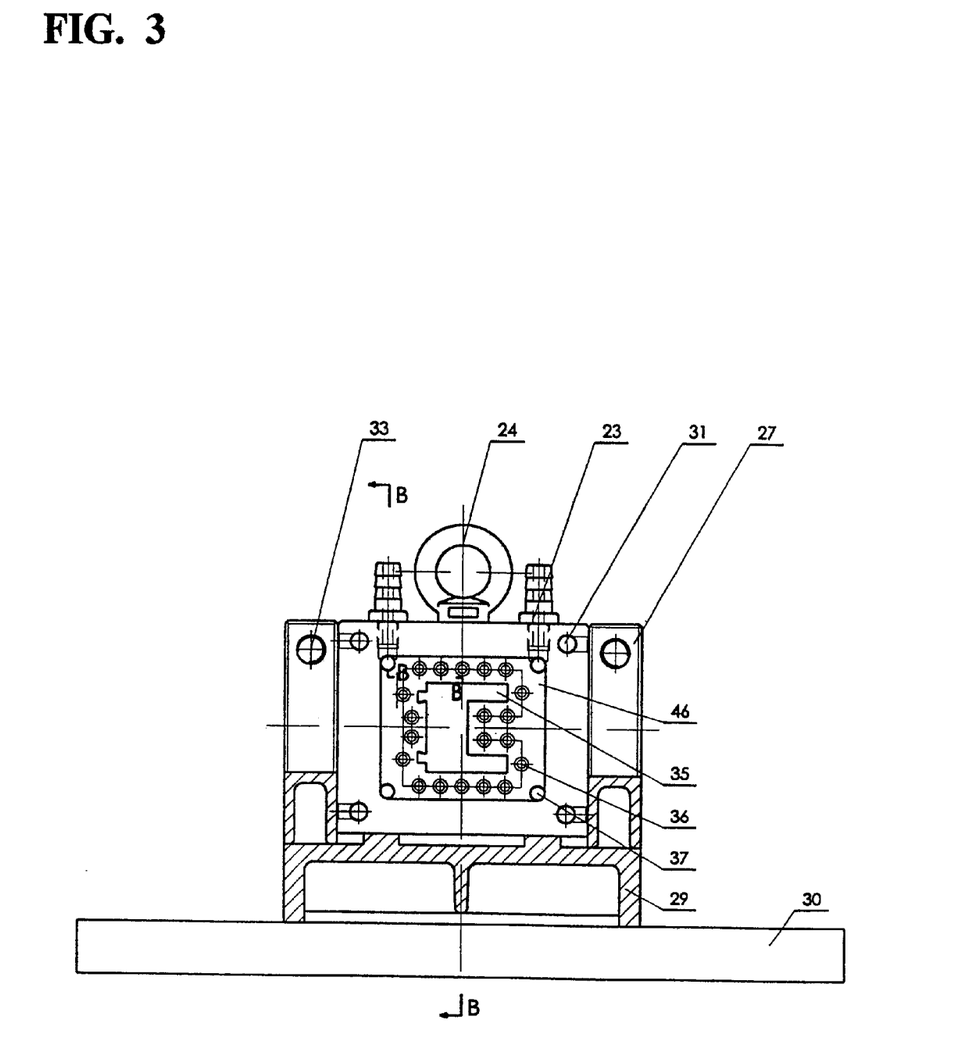
FIG. 3 is a sectional view along A—A in FIG. 2.
Figure 4:
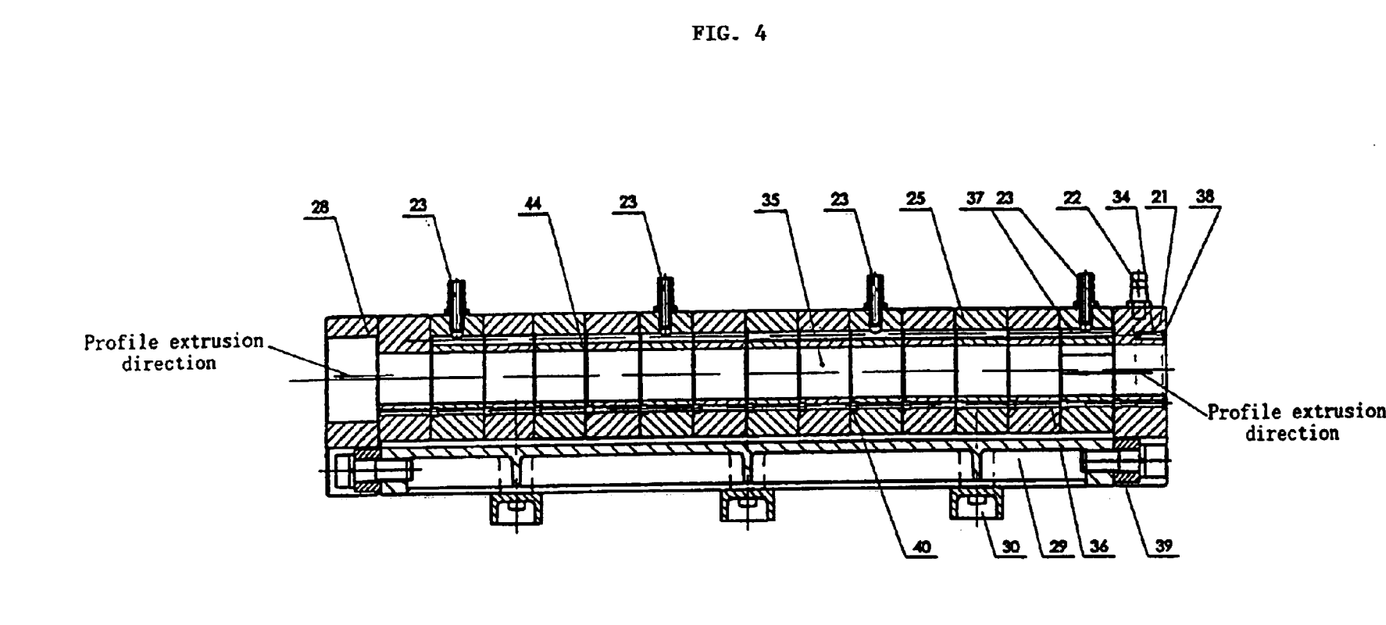
FIG. 4 is a sectional view along B—B in FIG. 3.

As shown in FIGS. 3 and 4, concave stand 46 is milled at the left of the middle plate 25 and the inlet plate 21. At the four corners of the concave stand 46, gas holes 37 are drilled. The gas slots 44 are formed by the combination of plates in turn, and the gas slots 44 are connected with each other in series via the gas holes 37 at the four corners. Gas is taken out in subsection through gas holes 37 communicated with each other, and each gas slot 44 contributes itself to the parallel connection between sections. The gas path of alternate series-parallel connection improves the effective cross section for gas extraction to its maximum, and that favorable vacuum condition will be established at the channels of the whole cavity 35. All gas holes 37 and all gas slots 44 are communicated with each other. No gas holes 37 are formed at the inlet plate 21 and the last middle plate 25. Cavity 35 at the outlet plate 28 is a rectangle cavity for covering the cavity 35 at the middle plates 25.

As shown in FIGS. 5 to 8, annular water trough 34 surrounds the cavity 35 at the inlet end of the inlet plate 21. At the outlet end, water-through hole 36 is drilled in the annular water trough 34 surrounding the cavity, and that water-through hole is connected to the water hole 36 surrounding the cavity 35 at the middle plate 25. Water nozzle 22 connected with annular water trough 34 is installed on the inlet plate 21. Annular water trough 34 is blocked up inside the inlet plate 21 by the water sealing plate 38.

All the hole depths of the water holes 36 at the circumference of the cavity 35 are as long as 10 times of the hole diameter, or smaller than 10 times of the hole diameter, and as compared with the conventional extrusion sizer mold, the hole depth has reduced 4–12 times, and the technological process for manufacturing hole becomes even more simple. The hole precision is also improved, and it is easier to machining water holes 36 near the circumference of the cavity 35, so that the cooling efficiency is enhanced effectively.

Four water nozzles 22 and eight gas nozzles 23 are installed at the left end, right end and upper end of the inlet plate 21, and the upper end of the middle plate 25, which are used for water cooling and shaping, and for vacuumizing to ensure the quality of the profile.

The disassembly holes 26 installed about the inlet plate 21 and the middle plates 25 are used for mechanized disassembling.

The orientation grooves 45 machined at the lower ends of the inlet plate 21 and outlet plate 28 engage with the orientation block 39 to ensure the replacement of the cavity 35 after disassembly.

Figure 8:
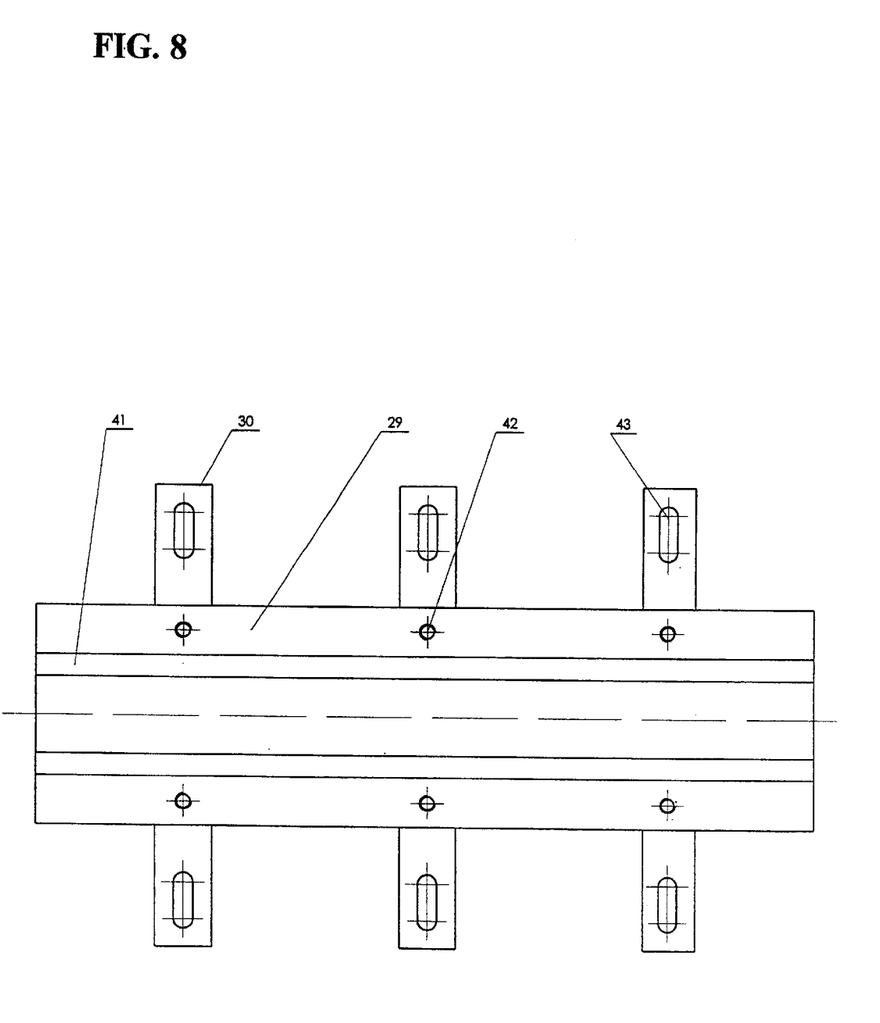
FIG. 8 is a vertical view of the base of the tandem sizer mold.

The base is constituted of the sole plate seat 30 with slotted holes 43, sole plate 29 fixed on the sole plate seat 30 through screw thread hole 42, and two orientation track 41 fixed on the sole plate 29.

For the conventional sizer mold designed and manufactured in conventional way, the cavity has to be divided into several parts, and the cooling water holes and gas slots must close to the cavity. The manufacture and the assembly must be finished in several stages, which bring troubles to the manufacture of the cavity, water holes and gas holes, and also bring troubles to the overall assembly and coaxiality of sections. Therefore the solution proposed in the present invention is to get rid of the conventional manufacture method, and to use new numerical control technique as much as possible, and the implementation of that solution, which has been depicted in design technical solutions, is to connect the several thin plates which is easy to machine together in series.

The above description is only an embodiment of the present invention, and is not considered to be a limitation of the present invention. Any kind of simple modification or equivalent alternation according to the spirit of the present invention will fall in the scope of the invention defined in the following claims.

What is claimed is:

1. A plastic tandem extrusion sizer mold comprising plating, a cavity, water holes, gas holes and gas slots, characterized in that an inlet plate, middle plates and an outlet plate are connected with each other in series by a columniform pin, and then side baffles are added to fix the plates on a base with the aid of bolts, a close cavity is formed in the center of the inlet plate, the middle plates and the outlet plate; there are no joints around the cavity, and the cavity has no parting sections; water holes and gas holes at the circumference of the cavity; a rubber sealing gasket, which connects water holes and separates gas slots, is disposed between the corresponding water holes of two plates; the cavity, gas slots, gas holes and gas nozzles communicate with each other, a water nozzle installed at the inlet plate communicates with the water hole, a gas nozzle installed on a selected middle plate;

the inlet plate, several middle plates and the outlet plate of the same thickness are placed upright and arranged in series longitudinally;

a concave stand is milled at one end face of the inlet plate and the middle plate;

the gas holes are drilled at the four corners of the concave stand, the gas slots are formed by the combination of plates and a concave stand in turn, and the gas slots are connected with each other in series via the gas holes at the four corners, so that gas is taken out in subsection from the gas nozzles on the selected middle plate and the connected gas holes and each gas slot contributes to the parallel connection between sections.

2. A plastic tandem extrusion sizer mold according to claim 1 characterized in that no gas holes are formed at the inlet plate and the last middle plate, and the cavity at the outlet plate is a rectangle cavity for covering the cavity at the middle plate.

3. A plastic tandem extrusion sizer mold comprising plating, cavity, water holes, gas holes and gas slots, characterized in that an inlet plate, middle plates and an outlet plate are connected with each other in series by a columniform pin, and side baffles added to fix the plates on a base with the aid of bolts, a close cavity is formed in the center of the inlet plate, the middle plates and the outlet plate; there are no joints around the cavity, and the cavity has no parting sections; water holes and gas holes at the circumference of the cavity; a rubber sealing gasket, which connects water holes and separates gas slots, is disposed between the corresponding water holes of two plates; the cavity, gas slots, gas holes and gas nozzles communicate with each other, a water nozzle installed at the inlet plate communicates with the water hole, a gas nozzle installed on a selected middle plate;

the inlet plate, several middle plates and the outlet plate of the same thickness are placed upright and arranged in series longitudinally;

an annular water trough surrounding the cavity at the inlet end of the inlet plate;

at the outlet end of the inlet plate a water-through hole is drilled in the annular water trough surrounding the cavity;

the water-through holes are of the same dimension and distribute uniformly;

the said water holes are connected to the said water holes surrounding the cavity at the middle plate;

a water nozzle connected with the annular water trough is installed on the inlet plate;

the annular water trough is blocked up inside the inlet plate by the water sealing plate;

the hole depths of all the water holes at the circumference of the cavity are as long as 10 times of the hole diameter, or smaller than 10 times of the hole diameter;

the water holes are machined beside the cavity;

the disassembly holes are installed on the said inlet plate and the middle plate; and orientation grooves of V shape are machined at the lower ends of the said inlet plate and outlet plate.

4. A plastic tandem extrusion sizer mold according to claim 3, characterized in that the said base is constituted of a sole plate seat, a sole plate, and two orientation tracks fixed on the sole plate.

5. A plastic tandem extrusion sizer mold, comprising:

plating, cavity, water holes, gas holes and gas slots;

a close cavity formed in the center of the inlet plate, the middle plates and the outlet plate;

water holes and gas holes at the circumference of the cavity, the cavity, gas slots, gas holes and gas nozzles communicating with each other;

a water nozzle installed at the inlet plate in communication with a water hole;

a gas nozzle installed on a predetermined middle plate;

the inlet plate, middle plates and an outlet plate being connected with each other in series by a columniform pin;

side baffles added to fix the plates on a base with the aid of bolts such that there are no joints around the cavity and the cavity has no parting sections;

a rubber sealing gasket, which connects water holes and separates gas slots, disposed between the corresponding water holes of two plates;

a concave stand milled at one end face of the inlet plate and the middle plate; and at the four corners of the concave stand, the gas holes are drilled, the gas slots being formed by the combination of plates and concave stand in turn, and the gas slots are connected with each other in series via the gas holes at the four corners so that, gas is taken out in subsection from the gas nozzles on the predetermined middle plate and connected gas holes, and each gas slot contributes itself to the parallel connection between sections.

6. A plastic tandem extrusion sizer mold according to claim 5, characterized in that no gas holes are formed at the inlet plate and the last middle plate, and the cavity at the outlet plate is a rectangle cavity for covering the cavity at the middle plate.

7. A plastic tandem extrusion sizer mold according to claim 6, characterized in that an annular water trough surrounds the cavity at the inlet end of the inlet plate; at the outlet end, water-through holes are drilled in the annular water trough surrounding the cavity, the water-through holes are of the same dimension and uniform distribution; the said water holes are connected to the said water holes surrounding the cavity at the middle plate, a water nozzle connected with the annular water trough is installed on the inlet plate, and the annular water trough is blocked up inside the inlet plate by the water sealing plate.

8. A plastic tandem extrusion sizer mold according to claim 5, characterized in that an orientation grooves of V shape are machined at the lower ends of the said inlet plate and outlet plate.

9. A plastic tandem extrusion sizer mold according to claim 8, characterized in that the said base is constituted of a sole plate seat, a sole plate, and two orientation tracks fixed on the sole plate.

* * * * *

UNITED STATES PATENT AND TRADEMARK OFFICE
CERTIFICATE OF CORRECTION

PATENT NO. : 6,702,560 B2
DATED : March 9, 2004
INVENTOR(S) : Ming Zhang and Fanglin Du It is certified that error appears in the above-identified patent and that said Letters Patent is hereby corrected as shown below:

Title page,
Item [76], Inventors, "TangCin Du" should read -- Fanglin Du -- and his address should read -- Rm. 509, Building 6 of Taiyueyuan, Haidian District, Beijing (CN) --.
Item [30], Foreign Application Priority Data, should read
-- May 8, 2000 (CN)..........00107267.6 --.

Signed and Sealed this

Twenty-eighth Day of September, 2004

JON W. DUDAS
*Director of the United States Patent and Trademark Office*